Figure 5:
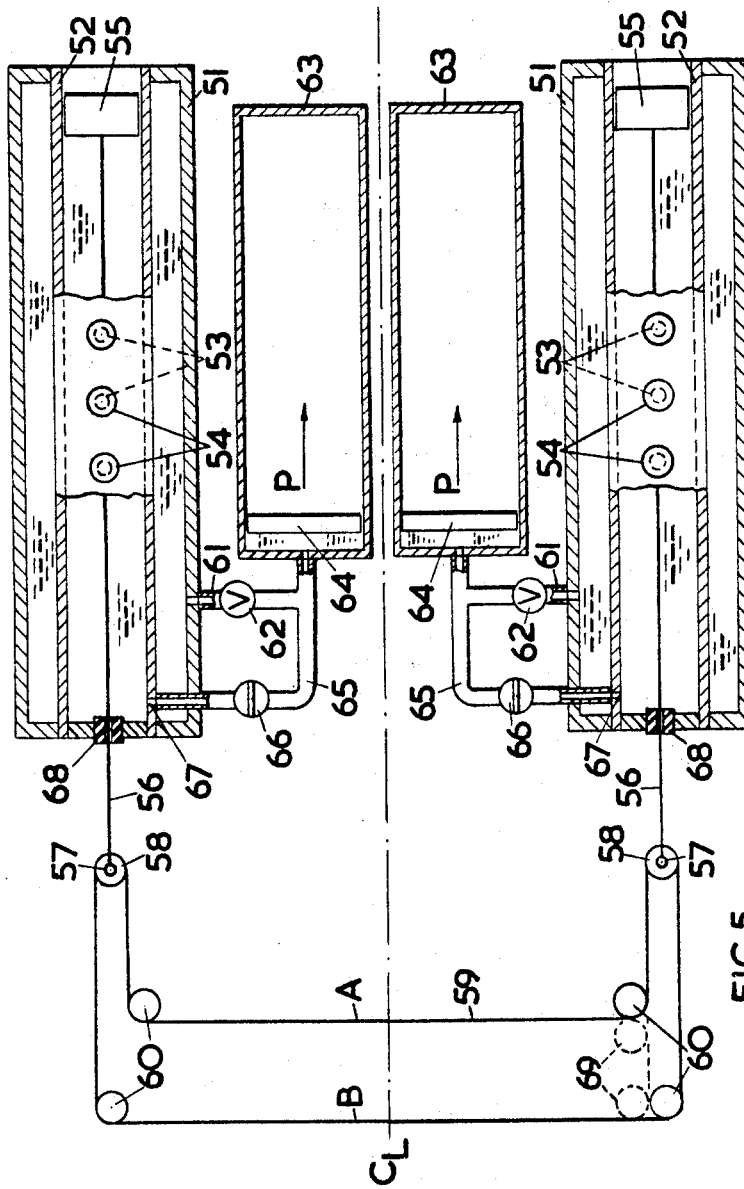

Sept. 13, 1966 J. THOMLINSON 3,272,460
ARRESTER GEAR FOR AIRCRAFT
Filed Dec. 31, 1964 4 Sheets-Sheet 1
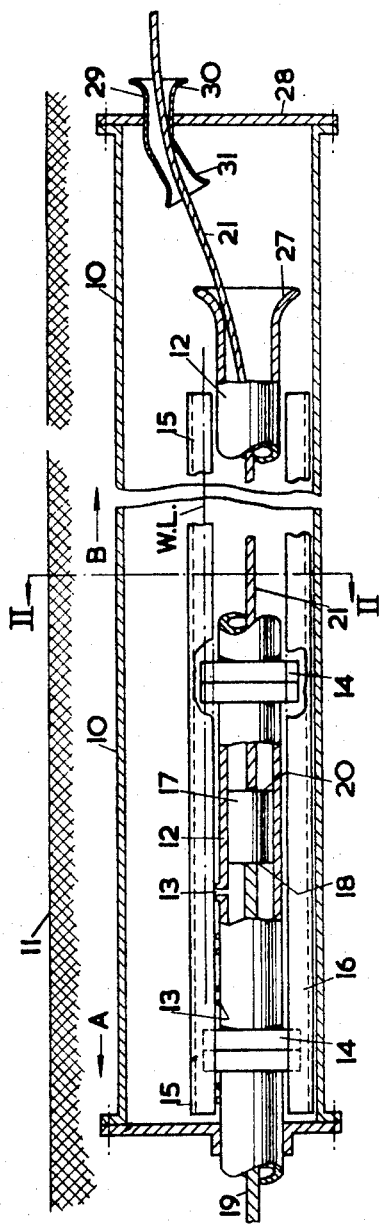
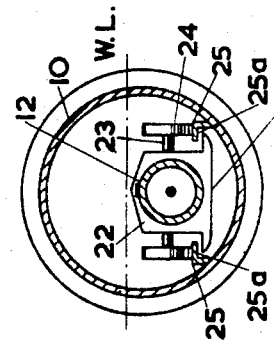
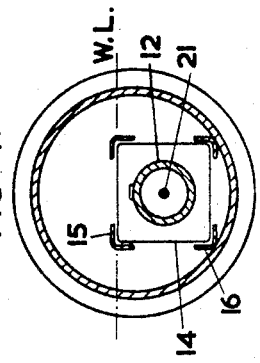

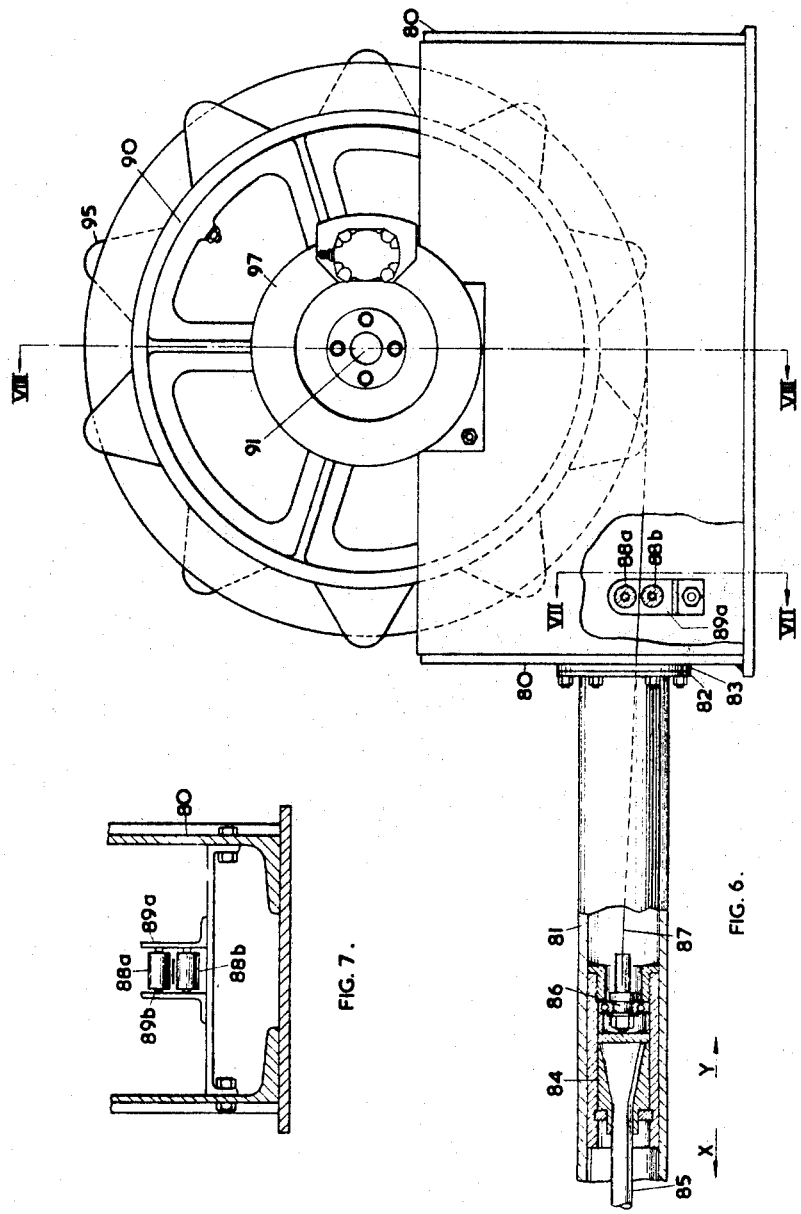

United States Patent Office 3,272,460
Patented Sept. 13, 1966

3,272,460
ARRESTER GEAR FOR AIRCRAFT
John Thomlinson, Bedford, England, assignor to the Minister of Aviation in Her Majesty's Government of the United Kingdom of Great Britain and Northern Ireland, London, England
Filed Dec. 31, 1964, Ser. No. 422,731
Claims priority, application Great Britain, Jan. 2, 1964, 171/64; July 10, 1964, 28,538/64
14 Claims. (Cl. 244—110)

This invention relates to arrester gear for aircraft which may be described broadly as being of the hydraulic type.

A particular type of such gear is known as a liquid spray arrester gear and includes an arrester cable which is engaged by an aircraft on landing, the ends of the cable being attached to a pair of pistons housed in a pair of long liquid-filled cylinders or tubes situated approximately horizontally one along each side of the runway, the cylinders having exhaust ports along their length. With such gear the arresting of the aircraft is brought about by the resistance of the liquid to the movement of the pistons after engagement of the cable by the aircraft, the arresting forces in the tube being controlled by the expulsion of the liquid from the ports during the motion of the pistons.

Whilst in general two spray tubes and associated pistons are used, the arrester cable may equally be connected to move a single piston in a single spray tube. In general the liquid used will be water.

There are several problems associated with the installation of liquid spray arrester gear as described above. Among these problems, if the spray tube cannot be installed approximately horizontally then the liquid tends to leak from the tube, either from the ports which therefore have to be fitted with valves, or past the piston when in the "ready" position. The latter problem alone has necessitated the construction of special end fittings at the resetting end of the tube through which passes a second or resetting cable that is used to draw the piston to the ready position after an arrest. Also, each arrest necessarily demands that the liquid expelled from the tube shall be replaced after the piston is reset in the ready position. If an anti-freezing mixture is used instead of water the replenishment of the lost mixture is expensive.

According to the invention in hydraulic arrester gear of the so-called liquid spray type the spray tube is mounted in a housing which, wholly or in part, encloses the tube and retains sufficient liquid to submerge the spray tube and is adapted to entrap within it liquid which is sprayed from the tube during an arrest.

The housing may itself be a tube of larger bore than the spray tube or it may be an open trough fitted with a superposed deflector which traps the liquid jets and returns the liquid to the trough.

The spray tube may be mounted within the housing either rigidly or movably, in the latter case, for example, on wheels or rollers. The housing may include trackways in which the tube is located or on which the rollers run. Means may be provided for maintaining the tube in engagement with the trackways to prevent its displacement or deformation during an arrest but which permits the withdrawal of the spray tube from the housing for servicing and similar operations.

As a secondary precaution a second arrester cable is provided for use should the first break or not be engaged by the aircraft and in accordance with the invention this is connected to a second spray tube located in the same housing as the former spray tube.

Another of the problems associated with the installation of arrester gear including a piston and tube arrangement as described is that after an arrest the piston has to be returned to the ready position at the end of the tube.

In one arrangement according to the present invention, hydraulic arrester gear for aircraft of the type described includes as the means for resetting the piston in the ready position, a flat flexible tape constituting the tailrope and a winding reel on which the tape is wound during resetting, whereby the inertia of the reel and tape combination is kept at a low level.

Advantageously the tape is wound on the reel with the successive coils one on top of the other.

Coupling means, such as a swivel coupling, may be provided for connecting the piston with the tape to resist or prevent twisting of the tape as will be caused by unavoidable rotation of the piston. Also, guide means, such as opposed rollers, may be provided within or adjacent the ready end of the cylinder, through which means the tape passes during arrest or resetting and which act to remove twists from the tape arising from malfunctioning of or friction in the coupling between the piston and the tape.

The reel may include a brake mechanism for bringing it to rest as the arrest proceeds.

In an alternative arrangement according to the invention and with a view to reducing the leakage and inertia problems associated with the use of a resetting cable or tape the housing is liquid tight and filled with liquid and has an outlet to a liquid reservoir to which liquid passes as an arrest takes place, the spray orifices comprise non-return valves and power means are provided for supplying liquid from the reservoir under pressure to the spray tube at the working side of the piston to return the piston to the reset position.

The power means may comprise a liquid pump or in an alternative arrangement the liquid expelled under pressure during an arrest passes through a non-return valve and moves a piston to compress air in a cylinder which is subsequently used to drive the liquid by an alternative path back to the spray tube to reset the piston.

Any liquid leakage which may occur past the piston or past the arrester cable where it leaves the tube is accounted for by a topping up pump which maintains the housing and spray tube at the working side of the piston full of liquid.

In a further embodiment according to the invention the arrester cable is connected through a reeving system to the piston whereby the movement of the piston is less than that of the aircraft during an arrest.

Various embodiments of the invention will now be described with reference to the accompanying drawings of which FIGURES 1, 2, 3 and 4 correspond to the drawings accompanying provisional specification of application No. 171/64 and FIGURES 6, 7 and 8 correspond to the drawings accompanying provisional specification of application No. 28,538/64.

Figure 8:
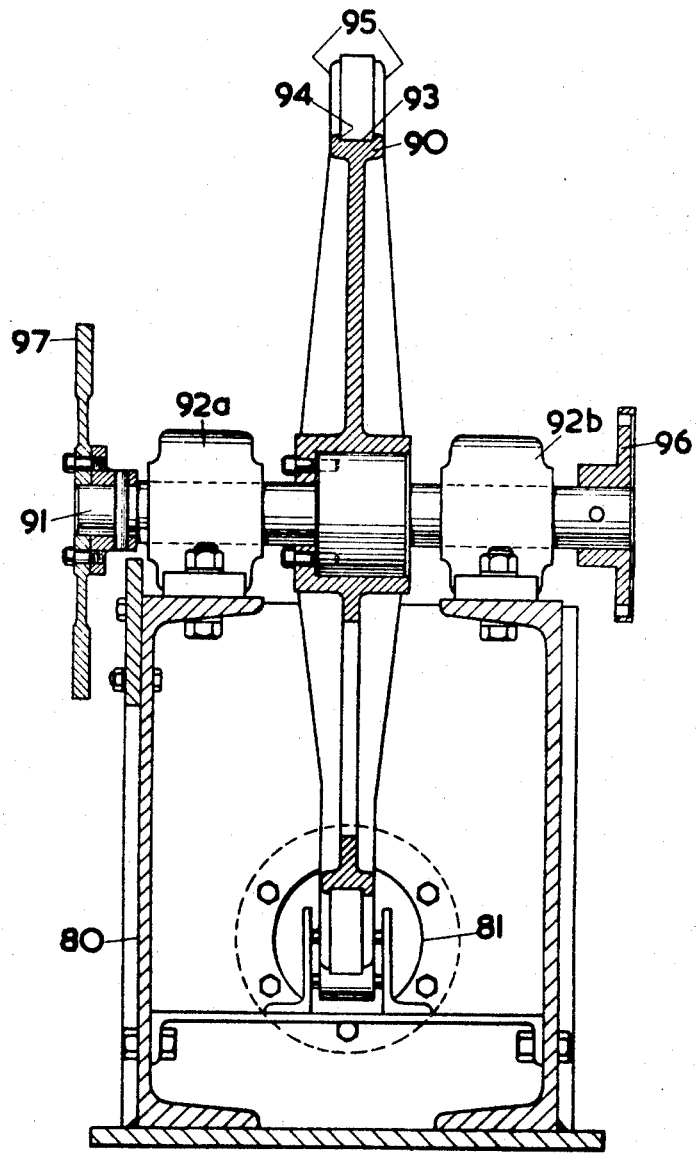

In the drawings:

FIGURE 1 is a side view partially in cross section of a first form of the invention, FIGURE 2 is an end view in cross section on the line II—II of FIGURE 1, FIGURE 3 is an end view in cross section of a second form of the invention, FIGURE 4 is a side view in cross section of the resetting end of the arrester gear, FIGURE 5 is a part sectional plan view of a third form of the invention, and FIGURES 6, 7 and 8 are a side view partly in cross section, a sectional view on the line VII—VII of a detail of FIGURE 6, and a sectional end view on the line VIII—VIII of FIGURE 6, of a fourth form of the invention.

Referring to FIGURES 1 and 2 the arrester gear shown comprises a housing 10 buried for a purpose to be described beneath the surface 11 of the airfield. The housing 10 has within it a spray tube 12 having exhaust ports 13 some of which are shown along the top other ports being submerged beneath the level of the water, W.L. contained in the housing. The spray tube is constructed of a number of lengths of tube joined together by the flanges 14 which are square in shape as shown in FIGURE 2. The tube 12 is supported within the housing 10 on the flanges 14 which engage with trackways 15 and 16 secured within the housing 10. These trackways 15 and 16 function to prevent buckling of the spray tube 12 under the compression load applied to the tube during an arrest.

The spray tube 12 itself houses the piston 17. The arrester cable proper 19 which traverses the runway (not shown) is attached to face 18 of the piston 17 and the resetting cable 21, by which the piston is drawn back to the ready position is attached to face 20 of the piston 17.

Referring to FIGURE 3 the embodiment illustrated differs from that shown in FIGURES 1 and 2 in that the flanges 22 carry spindles 23 for wheels 24, whilst the housing 10 is fitted with angular trackways 25 running the length of the housing. The lower faces of the flanges 22 are formed with projections 26 which fit beneath the horizontal lower face 25a of the trackways 25.

In the construction of FIGURE 3 the wheels 24 and trackways 25 allow the entire spray tube assembly to be withdrawn easily from the housing 10 for inspection and servicing work. In addition, the engagement of the projections 26 with the under side of the trackways 25 ensures that buckling of the spray tube will be resisted when the arresting loads are being applied.

Referring to FIGURE 4, at the resetting end of the arrester gear the spray tube 12 has a bell-mouth 27 and the end wall 28 of the housing 10 includes a conduit 29 also with bell-mouths at each end 30 and 31, the resetting rope 21 passing into the housing and the spray tube as shown.

Referring to FIGURES 1 to 4 it will be understood that in use the housing 10 is filled with water to a level indicated at W.L. which is above the exhaust ports 13 at the top of the spray tube 12 and that the conduit 29 shown in FIGURE 4 is above the water level.

During an arrest the piston 17 is pulled by the cable 19 in the direction of the arrow A thus squirting jets of water through the exhaust ports 13, the expelled water being trapped by the housing 10. After the arrest the gear is reset by traction on the rope 21 to pull the piston in the direction of the arrow B. This motion displaces water which will have entered the bell-mouth end 27 of the tube 12 and it re-enters the spray tube via the ports 13 in the working part of the tube bounded by the face 18 of the piston 17.

The trackways 15 and 16 are not essential in all constructions and may, for example, be replaced by supports which engage the spray tubes locally at regular intervals so as to prevent buckling.

Regarding the installation of the arrester gear described above, a tubular housing such as that described in relation to the drawings is advantageously buried below the normal frost level so that the working fluid can be water which does not include an anti-freezing ingredient. Another advantage of this buried installation is that wheeled vehicles, particularly heavy aircraft, can traverse the line of the gear without hazarding it or the vehicle.

Referring now to FIGURE 5, the arrester gear comprises a pair of housings 51, 51 and within the housings spray tubes 52, 52. Liquid orifices 53 . . . 53 are controlled by non-return valves 54 . . . 54 preferably in the form of clack valves. Pistons 55, 55 housed within the tubes 52, 52 are connected by piston cables 56, 56 to spindles 57, 57 carrying movable pulleys 58, 58. An endless arrester cable 59 passes over fixed pulleys 60 . . . 60 and round the movable pulleys 58, 58. Outlets 61, 61 lead from the housings 51, 51 through non-return valves 62, 62 to liquid accumulator cylinders 63, 63 at one side of liquid tight pistons 64, 64 in the cylinders 63, 63. Inlet passages 65, 65 lead from downstream of the non-return valves 62, 62 through control valves 66, 66 to the interior of the spray tubes at 67, 67. The system is filled with water which may contain an anti-freeze medium.

The pistons 55, 55 are shown in the reset position with the gear ready to arrest. In this position two runs A and B of the arrester cable are stretched tightly across the runway at right angles to the centre line C.L. When an aircraft engages either run A or B of the arrester cable the pistons 55, 55 are drawn along the spray tubes forcing the liquid through the orifices 53, 53. Liquid from the housings 51, 51 is thus forced through the outlets 61, 61 and non-return valves 62, 62 to the liquid accumulator cylinders 63, 63 in turn moving the pistons 64, 64 in the direction of the arrows P.P. and thus compressing air in the cylinders 63, 63 at the other side of the pistons 64, 64. To reset the piston 55, 55 the control valves 66, 66 are opened and the liquid is forced back into the spray tubes by the pressure of the compressed air in the cylinders 63, 63. To allow for any leakage of liquid from the spray tubes past the pistons 55, 55 or piston cables 56, 56 where the latter pass through glands 68, 68 at the forward end of the cylinders, a small liquid pump (not shown) is arranged to supply replacement liquid from a liquid reservoir (not shown) to the interior of the spray tubes.

In a modification of the arrangement illustrated at FIGURE 5, the outlets 61, 61 lead from the top most regions of the housings 51, 51 and lead direct to a liquid reservoir from which liquid can be pumped directly back to the interior of the spray tubes, in this case the supply pumps also serving as topping up pumps and the outlets will not require non-return valves.

Whilst in general it is advantageous to use a pair of housings 51, 51 etc. as shown, in some cases a single housing and the attendant gear will suffice. In this case the endless arrester gear will pass round two further fixed pulleys such as 69, 69.

The arrester gear illustrated by FIGURE 5 is particularly suitable where a large number of arrests have to be made in quick succession, as it enables the arrester cable to be reset very quickly.

Referring now to FIGURES 6, 7 and 8 these illustrate an arrangement in which a flat flexible tape is used for resetting the pistons. As shown the rewinding mechanism shown in FIGURES 1 and 2 consists of a base 80 secured to the water tube 81 by means of the flange 82 which seats on a rubber ring gasket 83 to make the connection between the tube and the base member 80 watertight. The water tube 81 houses the piston 84, the piston having an extension 85 to which the arrester gear cable (not shown) is attached. On the other or non-working face of the piston, there is a swivelling connection 86 to which a resetting cable 87 in the form of a steel tape is secured. The steel tape passes from the piston into the hollow base member 80 through a pair of guide rollers 88a, 88b, the rollers being mounted in side plates 89a, 89b which are fixed to the base member 80, for the purpose of untwisting the tape as it passes through them.

Referring in particular to FIGURE 8 the base 80 has mounted on it a reel 90 by means of a shaft 91 borne in bearings 92a, 92b the bearings housings being bolted to the base. The reel 90 is in the form of a disc or small axial dimension and has a groove 93 on its curved outer face to receive the steel tape 87. Each of the boundary walls of the groove 94 has a number of integral upstanding guard plates 95 to retain the steel tape on the reel.

One end of the shaft 91 carries a flange 96 by which a mechanism for turning the shaft during the resetting operation may be connected, the other end of the shaft carrying the disc component 97 of a disc brake mechanism (the other parts of the brake mechanism not being shown)

whereby rotation of the drum may be restricted as the arresting operation proceeds.

In operation the piston is situated in the ready position shown in FIGURE 8, that is adjacent to base member 80. During the arresting of an aircraft the piston is pulled in the direction of the arrow "X" which unreels the steel tape from the reel 90. As the arrest proceeds and the piston is decelerated the disc brake mechanism is applied to slow down and finally stop rotation of the reel. The piston is reset to the ready position by driving the shaft 91 in the reverse direction by the means (not shown) connected with the flange 96.

Generally, towards the completion of the rewind operation, the rewinding effort is relieved for a brief period to relieve the forces in the swivelling connection 86 so that the tape will thereby untwist as it relieves itself of the inevitable twisting stresses which will arise during the arrest. Some twisting is inevitable because the rotation of the piston in the cylinder can never be entirely eliminated even with the use of special non-twisting arrester cable. In this connection the use of non-circular cylinders or piston guides are undesirable in arrester gear of this type.

The advantage of the invention is that the use of the thin flat steel tape as the resetting cable keeps the inertia of the rotating resetting mechanism at a low level because the reel on which it is wound is of very small axial dimensions compared with, for example, a conventional drum as would be needed to receive a conventional cable. Also the use of the flat steel tape means that the change of inertia of the system as the tape is wound on or unwound from the reel is relatively small. Resulting from these constructional advantages the relatively low inertia of the reeling-in system means that it offers a relatively small resistance to the acceleration of the piston during the early stages of an arresting operation. Likewise the braking forces needed to keep the steel tape taut as the arrest proceeds and to bring the reel to a halt will be markedly lower than in the case of a comparable drum type mechanism.

I claim:

1. An arrester gear for aircraft comprising
   a perforated tube, the perforations being distributed lengthwise of the tube,
   a piston within the tube,
   an arrester cable,
   support means supporting the cable across the path of an aircraft to be arrested,
   connecting means operatively connecting the arrester cable to the piston,
   a housing enclosing the perforated tube,
   liquid contained within the housing and in which the perforated tube is submerged, and wherein upon arresting engagement of an aircraft with the arrester cable the piston is drawn along the tube and a braking effect is achieved by the expulsion of liquid from the perforated tube through the perforations in it and the liquid is retained in the housing.

2. An arrester gear for aircraft as claimed in claim 1 and comprising
   a pulley sheeve system,
   a piston cable connecting the pulley sheeve system to the piston,
   and said arrester cable passing over the pulleys whereby the distance moved by the piston is less than that moved by an aircraft during an arrest.

3. An arrester gear as claimed in claim 1 and comprising a flat flexible tape,
   swivel coupling means connecting the piston to the tape at the other side of the piston to the arrester cable to permit relative rotation between the tape and the piston,
   a reel for supporting the tape with successive coils one on top of the other and
   motor means for driving the reel to wind on the tape and reset the piston.

4. An arrester gear as claimed in claim 2 and comprising a flat flexible tape,
   swivel coupling means connecting the piston to the tape at the other side of the piston to the arrester cable to permit relative rotation between the tape and the piston,
   a reel for supporting the tape with successive coils one on top of the other and
   motor means for driving the reel to wind on the tape and reset the piston.

5. An arrester gear as claimed in claim 1 in which the housing comprises
   a trough, and in which a deflector is supported at the upper region of the trough whereby liquid expelled from the spray tube during an arrest impinges against the spray tube and is returned to the trough.

6. An arrester gear as claimed in claim 5 and comprising
   a pulley sheeve system,
   a piston cable connecting the pulley sheeve system to the piston,
   and said arrester cable passing over the pulleys whereby the distance moved by the piston is less than that moved by an aircraft during an arrest.

7. An arrester gear as claimed in claim 5 and comprising:
   a flat flexible tape,
   swivel coupling means connecting the piston to the tape at the other side of the piston to the arrester cable to permit relative rotation between the tape and the piston,
   a reel for supporting the tape with successive coils one on top of the other and
   motor means for driving the reel to wind on the tape and reset the piston.

8. An arrester gear as claimed in claim 6 and comprising
   a flat flexible tape,
   swivel coupling means connecting the piston to the tape at the other side of the piston to the arrester cable to permit relative rotation between the tape and the piston,
   a reel for supporting the tape with successive coils one on top of the other and
   motor means for driving the reel to wind on the tape and reset the piston.

9. An arrester gear for aircraft comprising
   a tube,
   a piston within the tube,
   an arrester cable,
   support means supporting the cable across the path of an aircraft to be arrested,
   connecting means operatively connecting the arrester cable to the working side of the piston,
   a liquid tight housing enclosing the tube,
   liquid contained within the liquid tight housing and at the working side of the piston,
   non-return valves connecting the interior of the tube to the interior of the housing,
   a liquid reservoir,
   an outlet liquid passage connecting the interior of the housing to said reservoir,
   an inlet liquid passage connecting the reservoir to the interior of the tube at the working side of the piston,
   control valve means in said inlet liquid passage, and,
   power means operative to pump liquid through the inlet liquid passage from the reservoir to the interior of the tube at the working side of the piston at the end of an arrest to reset the piston, said control valve means closing said inlet passage during an arrest but permitting liquid to be pumped through said inlet passage by said power means from the reservoir at the end of an arrest.

10. An arrester gear for aircraft as claimed in claim 9 and comprising
    a pulley sheeve system, a piston cable connecting the pulley sheeve system to the piston, and said arrester cable passing over the pulleys whereby the distance moved by the piston is less than that moved by an aircraft during an arrest.

11. An arrester gear for aircraft as claimed in claim 9 and comprising
a second spray tube and piston located in the liquid tight housing and operatively associated with a second arrester cable.

12. An arrester gear as claimed in claim 9 comprising
a non-return valve in the outlet passage,
a hollow cylinder,
a secondary piston in the cylinder,
said outlet passage connecting the interior of the housing to the interior region of said cylinder at one side of said secondary piston, which region comprises the reservoir and in which, during an arrest, gas contained in a second region of the cylinder at the other side of the secondary piston is compressed, the secondary piston and cylinder thus comprising both the reservoir and power means, the compressed gas serving to pump liquid from the cylinder to the interior of the tube through the inlet liquid passage when the control valve in the latter is opened whereby the piston is reset.

13. An arrester gear for aircraft as claimed in claim 12 and comprising
a pulley sheeve system,
a piston cable connecting the pulley sheeve system to the piston,
and said arrester cable passing over the pulleys whereby the distance moved by the piston is less than that moved by an aircraft during an arrest.

14. An arrester gear for aircraft as claimed in claim 12 and comprising
a second spray tube and piston located in the liquid tight housing and operatively associated with a second arrester cable.

No references cited.

MILTON BUCHLER, *Primary Examiner.*

L. C. HALL, *Assistant Examiner.*